US009473628B2

(12) United States Patent
Marimuthu et al.

(10) Patent No.: US 9,473,628 B2
(45) Date of Patent: Oct. 18, 2016

(54) METHOD AND SYSTEM FOR PROVIDING COMMUNICATION HOLD STATUS MANAGEMENT

(71) Applicant: Verizon Patent and Licensing Inc., Arlington, VA (US)

(72) Inventors: Ramesh Marimuthu, Edison, NJ (US); Tanya D. Cherifi, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 14/334,323

(22) Filed: Jul. 17, 2014

(65) Prior Publication Data

US 2016/0021247 A1    Jan. 21, 2016

(51) Int. Cl.
*H04W 4/16* (2009.01)
*H04M 3/428* (2006.01)
*H04M 1/725* (2006.01)

(52) U.S. Cl.
CPC ....... *H04M 3/4286* (2013.01); *H04M 1/72527* (2013.01); *H04W 4/16* (2013.01)

(58) Field of Classification Search
CPC ......... H04M 3/4286; H04M 1/72527; H04M 3/428; H04M 1/725; H04M 3/487; H04M 1/72522; H04M 3/4285; H04W 4/16; H04W 4/12; H04W 68/00; H04W 4/00; H04W 60/00; H04L 12/58
See application file for complete search history.

(56) References Cited

U.S. PATENT DOCUMENTS

| | | | | |
|---|---|---|---|---|
| 5,400,388 A * | 3/1995 | Heo | ................. | H04M 1/72513 455/572 |
| 6,011,845 A * | 1/2000 | Nabkel | ................. | H04M 3/42 379/201.01 |
| 6,031,905 A * | 2/2000 | Furman | ................. | H04M 3/428 379/215.01 |
| 6,219,415 B1 * | 4/2001 | Deutsch | ................. | H04M 3/428 379/162 |
| 6,563,916 B1 * | 5/2003 | Deutsch | ................. | H04M 3/428 379/215.01 |
| 7,006,618 B1 * | 2/2006 | Shaffer | ................. | H04M 1/2535 379/215.01 |
| 7,248,860 B2 * | 7/2007 | Kamdar | ................. | H04M 3/428 455/414.1 |
| 8,363,818 B2 * | 1/2013 | Gupta | ................. | H04M 1/247 379/266.06 |
| 8,447,021 B2 * | 5/2013 | Zourzouvillys | ..... | H04M 3/4285 379/201.01 |
| 8,626,129 B2 * | 1/2014 | Sennett | ................. | H04M 3/4285 455/413 |
| 8,879,703 B1 * | 11/2014 | Lavian | ................. | H04M 3/493 379/201.01 |
| 2003/0059014 A1 * | 3/2003 | Ross | ................. | H04L 12/58 379/201.01 |
| 2004/0176079 A1 * | 9/2004 | Fratti | ................. | H04M 1/72513 455/414.1 |
| 2005/0147227 A1 * | 7/2005 | Chervirala | ................. | H04M 3/4286 379/215.01 |
| 2007/0121878 A1 * | 5/2007 | Shaffer | ................. | H04M 3/4286 379/215.01 |
| 2010/0228914 A1 * | 9/2010 | Xie | ................. | G06F 12/0893 711/113 |
| 2010/0245111 A1 * | 9/2010 | Gaensler | ................. | H04M 1/72513 340/4.4 |

* cited by examiner

*Primary Examiner* — Meless Zewdu

(57) ABSTRACT

An approach is provided for providing media and alert notification during a hold status of a communication session. The approach includes detecting a hold status of a communication session associated with a device. The approach also includes monitoring hold media transmitted to the device during the hold status and processing the monitored hold media to determine a variation in a characteristic of the hold media. The approach further includes determining a change in the hold status based on the variation; and presenting an alert notification on the device, another device, or a combination thereof to indicate the change in the hold status.

20 Claims, 8 Drawing Sheets

METHOD AND SYSTEM FOR PROVIDING COMMUNICATION HOLD STATUS MANAGEMENT

BACKGROUND INFORMATION

User devices (e.g., mobile devices, tablet devices, etc.) have increasingly become the main device for communication. Often times, the user may be placed on hold by a representative during a communication for a lengthy and indeterminate period of time. This can lead to frustration by the user. During the hold period, the user generally must monitor the communication to determine when the hold period ends and the representative returns, and thus cannot be fully engaged in another activity while on hold. As a result, service providers face significant technical challenges to enabling users to be informed of the hold status of a communication. Thus, there is a need for providing hold status management.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing hold status management, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
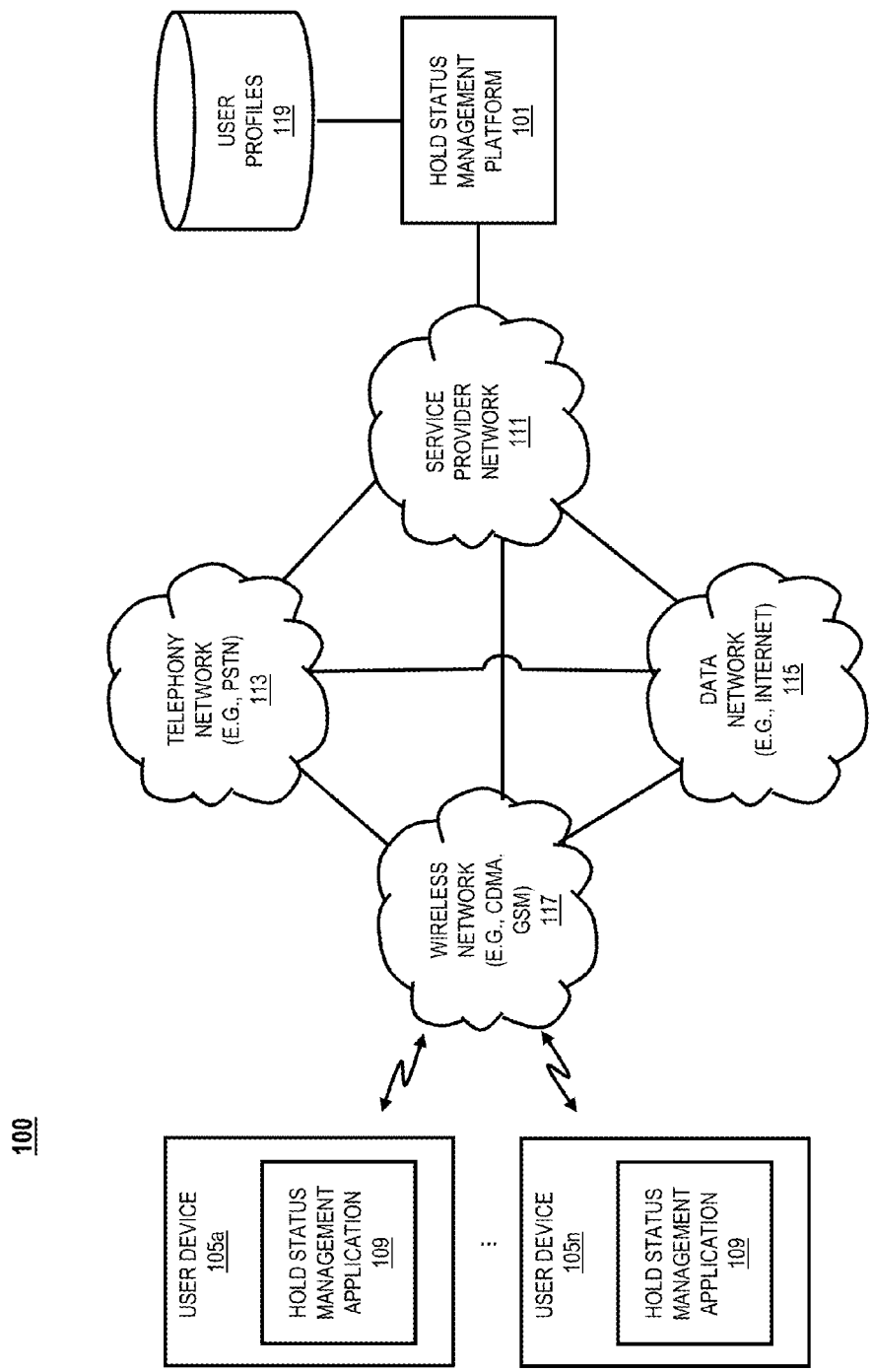
FIG. 1 is a diagram of a system capable of detecting and monitoring a hold status of a communication, according to one embodiment.

FIG. 1 is a diagram of a system capable of managing a hold status of a communication session, according to one embodiment. As noted above, users often need and/or want tools to help manage a hold status of a communication to free the user to fully engage in other activities while on hold. For example, under a hold scenario, the user generally continues to listen on the communication device to determine when the user is no longer on hold (e.g., when the live representative comes onto the communication session or call). To listen, the user, for instance, typically will either hold the phone and listen or engage a speakerphone function on the calling device to manually monitor when the hold status of the call changes. This, in turn, can be tiring to the user or disturbing to others people nearby the user.

To address this problem, a system 100 of FIG. 1 introduces a capability for a hold status management platform 101 to detect and manage a hold status of a communication session, such as a voice communication session or a video communication, that are conducted by the users using user devices 105*a*-105*n* (also collectively referred to as user device 105) over a network, such as such as the telephony network 113, wireless network 117, and data network 115. In one embodiment, when a user is placed on hold during a communication session, the system 100 enables a user to activate a hold status management function to automatically determine when a hold status of the communication session changes and to alert the user accordingly. For example, various embodiments of the system 100 detect changes in the media transmitted during a communication session that has been placed on hold to determine when a live session has resume, by for instance, monitoring the hold music (e.g., when the hold music starts or stops) played back during the session. a1

In other words, in some embodiments, the system 100 uses changes in the hold media being transmitted as an indicator of the hold status of the communication session. Accordingly, in one embodiment, the system 100 samples or processes a portion of the hold media (e.g., hold music or hold tone) when a communication is on hold to determine various characteristics (e.g., frequency, tone, pattern, volume level, etc.). In one embodiment, the portion that is sampled or processed can include, for instance, the first 10 seconds or any other duration of the hold media. Once the system 100 acquires this sample of the hold media and/or the sample's characteristics, the system 100 can use the sample to monitor when changes to the hold media and/or its characteristics are indicative of a change in the hold status.

In yet another embodiment, the system 100 can also replace the hold media being transmitted with other media (e.g., a tone, song, video, or other content) selected based on user's preferences or preset configuration. In some embodiments, the media selected for replacement can also be based on the characteristics of the original hold media (e.g., replacement media may be selected to match the frequency, tone, etc. of the hold media). This replacement media can be, for instance, any user media that can be played back from the communication device or streamed to the communication device. When the hold status changes to a live communication, the replacement of the hold media can end.

As shown in FIG. 1, in one embodiment, the user device 105 may communicate over system 100 and include any customer premise equipment (CPE) capable of conducting a communication session over one or more of networks 111-115 (for instance, mobile devices (e.g., any cellular phone, smart phone, wireless, phone), other mobile computing devices, such as a laptop computer, a notebook computer, a netbook computer, a tablet, a desktop computer, and/or other computing devices capable of conducting a communication session over a communication network).

By way of example, a hold status of a communication session corresponds to when the communication session with the user is placed on hold before beginning a communication session or resuming the communication session (e.g., to wait for a live operator, such as when in a queue for a customer service representative for a company). Under this hold scenario, the user originating the call typically is the only live party (e.g., the user) participating in the communication session during the period in which the communication is placed on hold. For example, a user may call a company's customer service phone number using the user device and may be placed on hold while waiting for a live customer service representative to service the call after providing prompts by a voice information system, such as an interactive voice response unit, and/or during the course of a call with the live customer service representative.

In one embodiment, the system 100 includes an application suite (e.g., hold status management applications 109a-109n (collectively referred to as the hold status application 109)) that can perform all or a portion of the functions of the hold status management platform 101. The application suite may include any type of application that can be executed on the user device 105. The application suite includes the hold status management applications 109 and can also include client programs (e.g., calendar applications, communication applications, Internet browsing applications, music applications (e.g., music streaming applications, music player applications, etc.)), services, or the like that utilize the hold status management platform 101 or other services, applications, content, etc. available over the communication network. In one embodiment, the hold status management platform 101 may interface with one or more of the applications 109 on the user device 105 to perform one or more functions described herein.

In one embodiment, the hold status management platform 101 may detect a hold status based on a prompt by the user when the hold status begins. By way of example, the user may prompt the hold status management platform 101 by executing the hold status management application 109 when a hold status of a communication session is initiated by the other party. In yet another embodiment, the hold status management application 109 runs in the background, for example, as a background process, of the user device 105. The hold status management application 109, for instance, functions as a "hold screener" during communications sessions established and conducted by the device 105. By way of example, the hold status management application 109 can be automatically executed when a communication session is established by the device 105 to detect and monitor a hold status.

In one embodiment, the hold status management platform 101 can capture a sample of a communication session to detect a hold status. In one embodiment, the hold status management platform 101 can detect a hold status based on one or more characteristics of a captured reference sample of the communication session. As discussed above, the one or more characteristics may include frequency, tone, pattern, volume level, or any combination thereof, as well as other audio characteristics. The hold status management platform 101 may detect a hold status when one or more characteristics of the captured sample corresponds to one or more characteristics of hold media. The one or more characteristics of hold media can be distinguishable from one or more characteristics of a live, human, voice. By way of example, hold media include: advertisements, news, music, video, weather updates, among others, etc., or any combination thereof. When a hold status is detected, the hold status management platform 101 may monitor the hold status to determine any variations in the hold media to determine any changes in the hold status (e.g., when the live operator initiates and/or an update in estimated time is provided).

In one embodiment, the hold status management platform 101 provides an alert notification indicating a hold status change. In some embodiments, the hold status change can be when, for example, the live operator initiates and/or resumes the communication session, the wait times for the live operator to initiate the communication session have been updated, etc. The alert notification includes a visual alert, an audio alert, a vibration alert, or a combination thereof. For example, the user may receive a pop-up on a device with an audio alarm indicating that the live representative is on the call. By way of another example, the user may receive a pop-up on a device indicating that the hold time has been updated. In another example, the user may also receive a vibration alert with the pop-up. In one embodiment, the hold status management platform 101 enables the user to customize the alert notification and/or device(s) 105 to receive the alert notification. In this way, a user can divert the communication session to another device and/or receive the alert notification on another device. For example, during the hold status, another device may be selected by the user to receive the alert notification, for example, by including that device in the user profile.

In one embodiment, the hold status management platform 101 monitors and processes the hold media transmitted to the device 105 during the hold status. In one embodiment, the hold status management platform 101 determines a change in the hold status based on a variation in the hold media transmitted to the device 105 during the hold status. In one embodiment, the variation in the hold media can be determined by comparing one or more characteristics of the hold media to one or more characteristics to a captured reference sample. In one embodiment, the hold status management platform 101 can determine that the variation corresponds to a change in hold status, for example, when one or more characteristics of the hold media better corresponds to one or more characteristics of a live operator, the variation of the one or more characteristics is outside a range of the one or more characteristics of the reference sample, among others. In this way, the hold status management platform 101 can differentiate between variations in hold media resulting from transmission of different hold media to the device and return of a live operator. For example, the hold media may initially include both music and advertisements.

In one embodiment, the hold status management platform 101 can replace the hold media with user media for presentation at the device, another device, or a combination thereof, during the hold status. The user media may include an application suite of one or more applications, visual and/or audio media from a media source, etc. In one embodiment, the user media may be based on a user profile. In this way, the user media may be user configurable. For example, the user may indicate in the user profile that a music streaming application be executed to provide user media to (e.g., a specific channel) replace any hold media. In yet another embodiment, the user media may additionally and/or alternatively be selected based on a user preference, a preset configuration, and/or the content or other characteristics of the hold media. For example, the user may indicate that the music come from locally stored content rather than the music streaming application when not connected to a data network.

In one embodiment, the system 100 may support different configurations of the application 109 depending on whether the embodiments of the features described herein are implemented as device-based features or network-based features. For example, if a service provider supports the application 109 in a device-based embodiment, the application 109 may be native to the device 105. If the application 109 is supported by a third party or the user may want to download to additional devices, the application 109 may be downloadable. For example, if the user has a wireless device number associated with the user's tablet, the user can login with that device's number or the primary mobile device's number depending on which number is used for initiating the communication session.

In one embodiment, subscribers (businesses offering the services of the hold status management platform 101 as at least part of their service offerings) may implement the hold status management platform 101 on a mobile device client, network host, cloud-based host, web-based client, or combination thereof. The implementation chosen may determine the varying levels of the system 100's privacy and functionality. According to one embodiment, in a user device-based implementation, where the hold status management platform 101 may be supported by a wireless carrier, the subscriber may install the hold status management platform 101 native to the device. According to another embodiment, where the user device-based implementation is wireless carrier agnostic, the hold status management platform 101 may be downloaded as a separate application.

In exemplary embodiments, any number of customers may access the hold status management platform 101 through any mixture of tiered public and/or private communication networks. According to certain embodiments, these public and/or private communication networks can include, for example, networks 111-115. For illustrative purposes, the networks 111-115 may be any suitable wireline and/or wireless network, and be managed by one or more service providers. For example, telephony network 111 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-115 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that networks 111-115 may include components and facilities to provide for signaling and/or bearer communications between the various components or facilities of system 100. In this manner, networks 111-115 may embody or include portions of an SS7 network, or other suitable infrastructure to support control and signaling functions.

Figure 2:
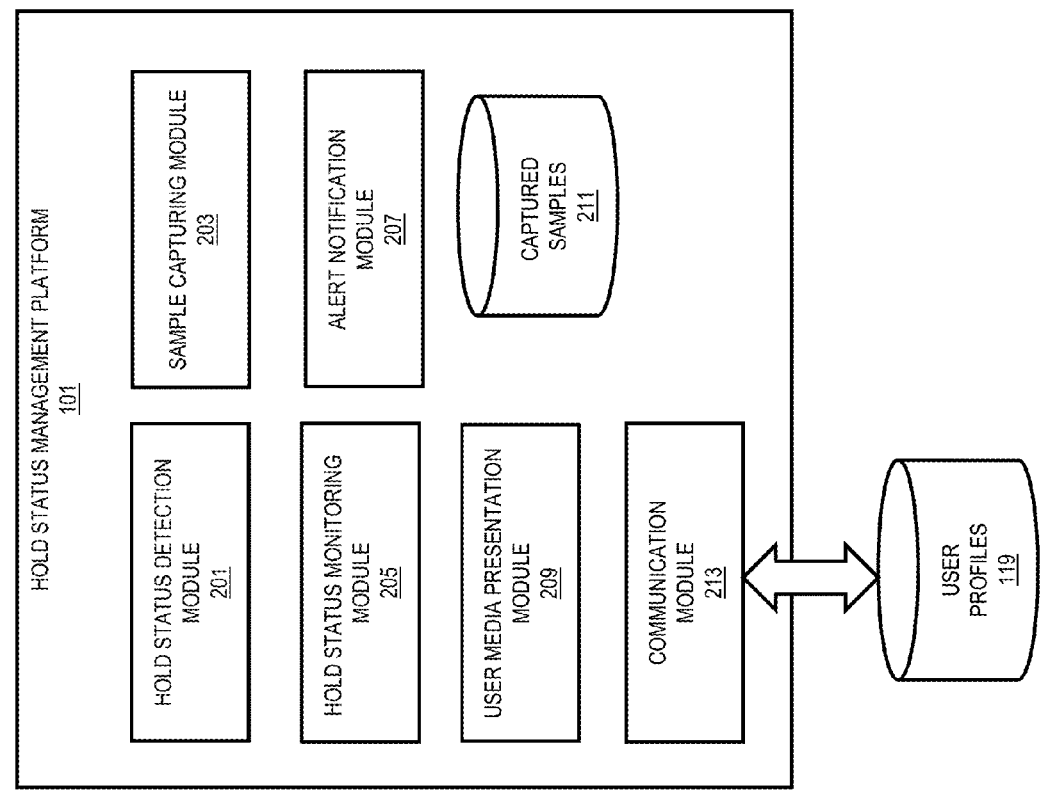
FIG. 2 is a diagram of a hold status management platform capable of monitoring and detecting a change in hold status of a communication session, according to one embodiment.

FIG. 2 is a diagram depicting the components of the hold status management platform 101, according to one embodiment. The hold status management platform 101 includes various executable modules for performing one or more computing, data processing and network based instructions that in combination provide a means for managing hold status of a communication Such modules can be implemented in hardware, firmware, software or a combination thereof. Although the hold status management platform 101 is depicted as a standalone component, it is contemplated that the hold status management platform 101 and/or its functions may be implemented in other components of the system 100 including the user devices 105 and the service provider network 111.

By way of example, the hold status management platform 101 may include a hold status detection module 201, a sample capturing module 203, hold status monitoring module 205, alert notification module 207, user media presentation module 209, captured sessions module 211, and a communication module 213. These modules 201-213 can interact with customer profiles 119 in support of their functions. According to some embodiments, the customer profiles 119 are maintained and updated based, at least in part, on one or more operations (e.g., communications operations) or transactions conducted on user devices 105.

In one embodiment, the hold status detection module 201 detects a hold status of a communication session associated with the device 105. In one embodiment, the hold status detection module 201 detects a hold status when the hold status is indicated by the user. For example, a user may execute the hold status management application 109 provided on the device 105 to indicate an initiation of a hold status (e.g., being placed on hold while waiting for a representative to initiate the call and/or resume the call).

In one embodiment, the hold status detection module 201 detects a hold status of a communication session associated with a device based on a captured reference sample of the communication session. In case of the hold status detection module 201 running in the background of a device and executing when a communication session is initiated on the device 105, the hold status detection module 201 may determine a hold status based on one or more characteristics of a captured sample of the communication session. The hold status detection module 201 may process the captured sample to determine a value for one or more characteristics and determine a hold status when one or more characteristics are within a range of values corresponding to hold media. For example, the hold status detection module may determine a hold status because hold media, such as music and news, have one or more common characteristics, for example, as compared to a live operator.

In one embodiment, the sample capturing module 203 captures one or more samples of the communication transmitted to the user device 105 during the communication session. In the case of the user indicating the initiation of a hold status, the sample capturing module 203 can capture a reference sample of the hold media transmitted during the hold status. The captured reference sample may be of a predetermined length (e.g., 2-10 seconds in length). In the case of the hold status detection module 201 running in the background, the sample capturing module 203 may continuously capture one or more samples of the communication transmitted to the user device 105 from which the hold status detection module 201 can detect the hold status based on one or more characteristics of the captured sample. By way of the example, a user may initiate a call to a customer service number during which periodic samples of the communication transmitted to the device may be captured until if and when the hold status detection module 201 detects a hold status from a captured sample. In that case, the captured sample may be temporarily stored as a captured reference sample of the hold media in the captured samples 211. In yet another embodiment, the sample capturing module 203 can captures one or samples of the hold media transmitted to the device during the hold status for monitoring of the hold status.

After a hold status of a communication session is detected by the hold status detection module 201, the sample capturing module 203 may work with the hold status monitoring module 205 to monitor the hold media transmitted to the device during the hold status to determine any variations. The variation can indicate a change in the hold status (e.g., a live operator has resumed the communication session). In one embodiment, the hold status monitoring module 205 can compare one or more characteristics of the hold media to one or more characteristics of the captured reference sample (e.g., frequency, tone, pattern, volume level, or any combination thereof) to determine a variation in the hold media. In this way, the hold status monitoring module 205 performs audio analysis of the hold media.

In one embodiment, the hold status monitoring module 205 can also process in real-time captured samples of the hold media to determine one or more characteristics for comparison to the reference sample. In one embodiment, the hold status monitoring module can determine a value corresponding to one or more characteristics of the reference sample and compare it to the one or more characteristics of the reference sample. The hold status monitoring module 205 can determine a change in the hold status based on the variation. By way of example, the hold status monitoring module 205 may determine that the hold status has ended and a live operator has returned based on a variation of one or more characteristics. For example, often times, music and/or news are transmitted to the device during a hold at a certain volume, while a live operator converses at a different volume. In yet another example, the hold status monitoring module 205 may determine the hold status has changed despite a variation in the one or more characteristics of the hold media. For example, music from a streaming application may be transmitted as hold media to the device. While some of the characteristics of the hold media may vary (e.g., frequency, pattern, etc.), for example, because the songs transmitted will be different from the song included in the reference sample, at least one of the characteristics may remain the same (e.g., the volume).

In one embodiment, the alert notification module 207 can present an alert notification to the device associated with the communication session, another device, or a combination thereof, when the hold status monitoring module 205 determines a change in the hold status. The alert notification can include a visual alert, an audio alert, a vibration alert, or a combination thereof. In one embodiment, the type of alert notification and/or receiving device(s) may configured by the user. For example, the user may store the type of notification and/or receiving devices in the user profiles 119. By way of the example, the user may select a pop-up with an audio alarm to alert that the hold status has ended. The user may also select that the device vibrate with the pop-up. In a further example, the user may indicate in the user profiles 119 that additional devices associated with that user profile receive the alert notification. For example, the user will be alerted of the change in hold status on his tablet even if his cell phone is associated with the communication session. In this way, the user is not confined to only the device associated with the communication session.

In one embodiment, the user media presentation module 209 presents user media to the user device 105 to replace the hold media after the holds status detection module 201 determines a hold status. In one embodiment, the user media presentation module 209 can determine what user media to present based on the user profile, present configuration, a content of the hold media or a combination thereof. For example, the user media presentation module 209 may replace the hold media with a music, video or other content from files stored on the device and/or cloud, such as stored playlist, or from a media providing application, such as a music streaming application. In some embodiments, the user media presentation module 209 can present user media to the device that was presented before the communication session. In one embodiment, the user media presentation module 209 can alternatively and/or additionally present one or more applications from the application suite, such as search engine application. By way of the example, the user media presentation module can present user media for the user to select and/or for verification before replacing the hold media. In one embodiment, the user media presentation module 209 can stop the presentation of the user media when the alert notification module 207 presents an alert notification. In one embodiment, the media presentation module 209 can process content parsed from the hold media and/or characteristics (e.g., audio characteristics such as frequency or tone) of the hold media to select replacement media. For example, user content that is similar in frequency, tone, or content can be selected to replace the hold media.

In one embodiment, the communication module 213 executes various protocols and data sharing techniques for enabling collaborative execution between the hold status management platform 101, the user devices 105, the hold status management application 109, the networks 111-117, and other components of the system 100. In addition, the communication module 213 enables generation of signals for communicating with various elements of the service provider network 111, including various gateways, policy configuration functions and the like.

Figure 3:
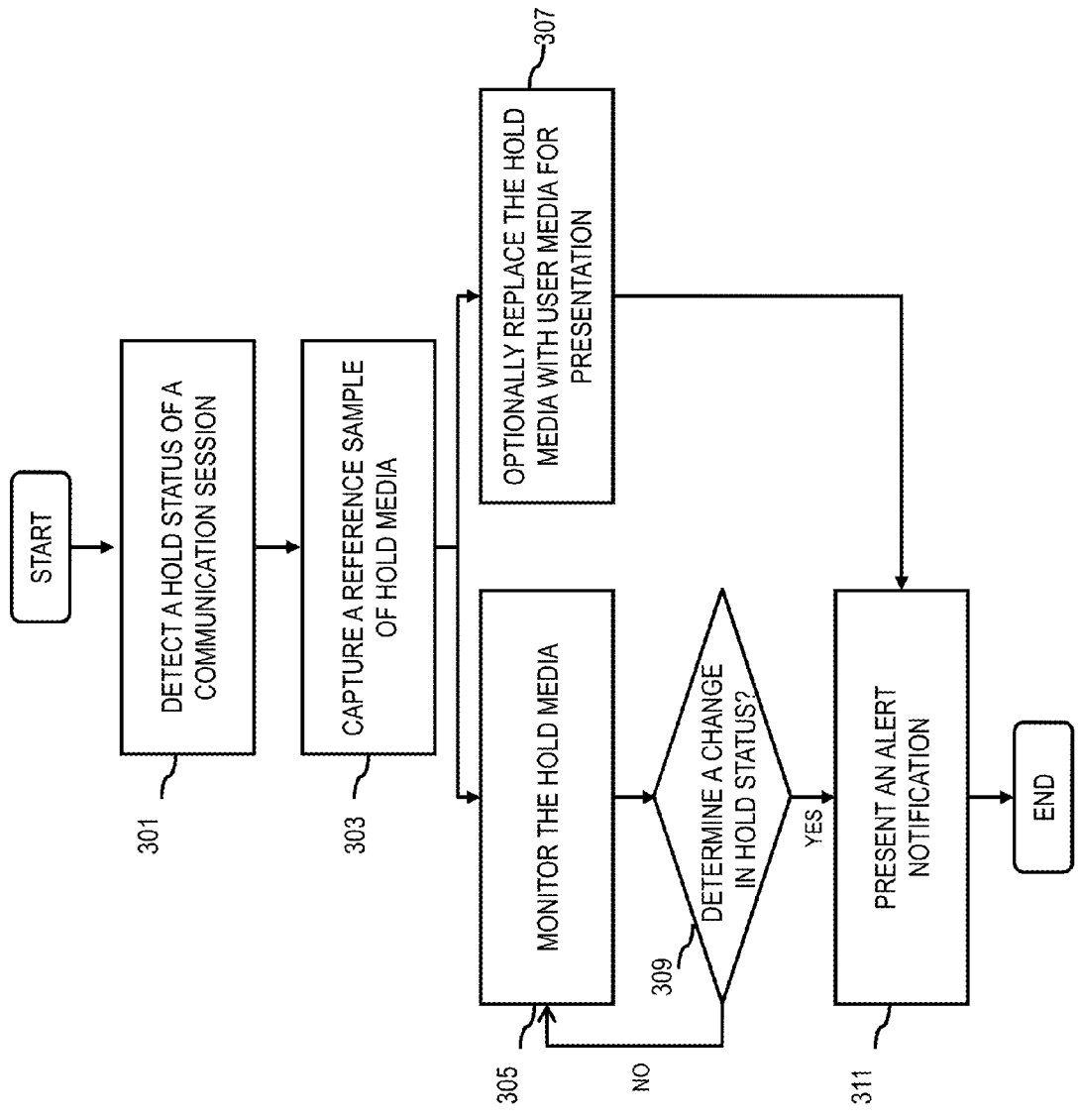
FIG. 3 is a flowchart of detecting and determining a change in hold status, according to one embodiment.
Figure 8:
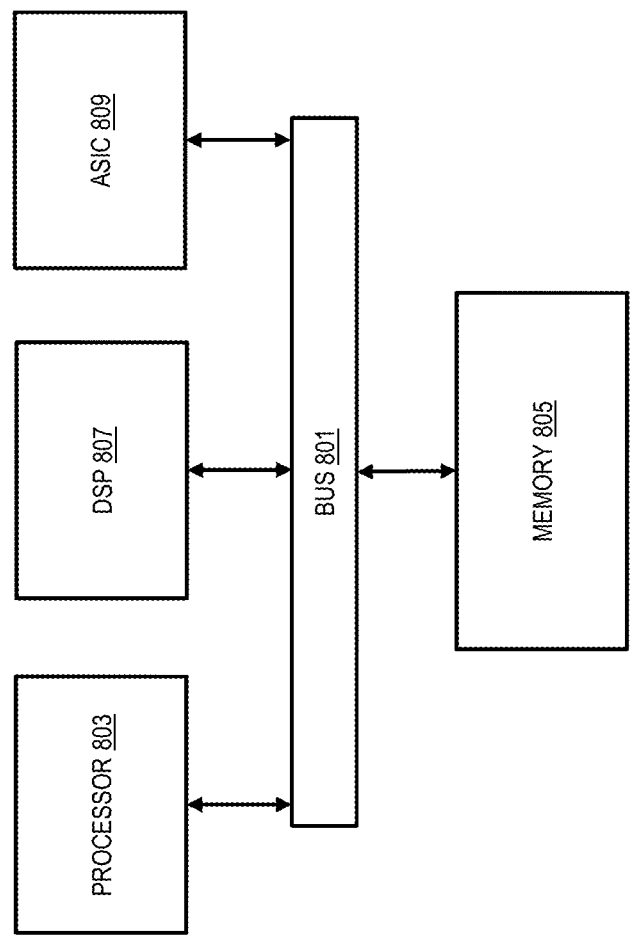
FIG. 8 is a diagram of a chip set that can be used to implement various exemplary embodiments.

FIG. 3 is a flowchart of executing various hold status management features, according to one embodiment. In one embodiment, the hold status management platform 101 performs the process 300 and is implemented in, for instance, a chip set including a processor and a memory as shown in FIG. 8. In addition or alternatively, the hold status management application 109 may perform all or a portion of the process 300. Although FIG. 3 illustrates steps 301 through 311 in a particular order, the order and number of steps is merely for explanation, and one or more steps may be performed in a different order or removed.

In step 301, the hold status management platform 101 detects a hold status of a communication session associated with the device. In one embodiment, the hold status management platform 101 detects the hold status based on an indication of the hold status by the user, for example, using the hold status management application 109. In one embodiment, the hold status management platform 101 may detect a hold status based on a processing of a sample of a communication transmitted to the device during the communication session. The hold status management platform 101 may detect a hold status by processing the sample to determine one or more characteristics of the hold media and/or communication. Accordingly, the hold status management platform 101 can detect a hold status by employing audio analysis engines, and the like, to determine one or more characteristics of the sample.

In step 303, the hold status management platform 101 captures a reference sample of the hold media. In one embodiment, the hold status management platform 101 captures a reference sample of the hold media to detect a hold status of a communication session in step 301. By way of example, the sample of the communication captured by hold status management platform 101 to detect a hold status may be a reference sample of the hold media. In one embodiment, the hold status management platform 101 may capture a reference sample of the hold media after detecting the hold status in step 301. By way of example, the hold status management platform 101 may capture the after the hold status is indicated by the user, for example, using the hold status management application 109.

In step 305, the hold status management platform 101 monitors the hold media to determine a variation in a characteristic of the media. The hold status management platform 101 may process a sample of the hold media to determine one or more characteristics of the hold media for comparison to the captured reference sample. In one embodiment, the hold status management platform 101 may compare the one or more characteristics of the hold media to the captured reference sample to determine a variation in the characteristic.

In step 307, the hold status management platform 101 may optionally replace the hold media with user media for presentation when a hold status is detected. In one embodiment, the hold status management platform 101 can present the user with user media options for replacement with the hold media. In one embodiment, the hold status management platform 101 may replace the hold media with the user media after verification by the user. For example, the hold status management platform 101 may prompt the user to confirm that that the hold media should be replaced with music, for example, from a music streaming application.

In one embodiment, the user media to be presented may be based on user profile, present configuration, a content of the hold media, or a combination thereof. According to one embodiment, the user may set a default user media to present in the user profile when a hold status is detected by the hold status management platform 101. In one embodiment, the user media presented may be based on the content of the hold media. For example, if music is presented as hold media, the user media to be presented may be music. In one embodiment, the hold media presented may also be based on present configuration. For example, the user may configure the device to conserve the associated data plan and therefore can choose to have music from a stored content file on the device to be presented rather than music from a streaming application when not connected to wireless fidelity (WiFi). The user can associate the user media to be presented with the present configuration of the device in the user profiles 119.

In step 309, the hold status management platform 101 may process the monitored hold media in step 305 to determine a variation in a characteristic of the hold media and whether that variation results in a change in the hold status of the communication session. In one embodiment, the hold status management platform 101 may compare one or more characteristics of the hold media to a captured reference sample to determine a variation in the one or more characteristic.

In step 311, the hold status management platform 101 may present an alert notification to a device when a change in hold status is determined in the step 309. The alert notification can include a visual alert, an audio alert, a vibration alert, or a combination thereof. The user can set customizable message tones, volume, pop-ups in the user profile 119. In one embodiment, the bold status management platform 101 can present an alert notification to the device associated with the communication session. In one embodiment, the hold status management platform 101 can additionally or alternatively present the alert notification to another device. For example, the user may receive a pop up on a device with an audio alarm indicating that the live representative is on the call to the user's cell phone, where the call originated, and the user's tablet. The user can set the devices to receive the notification in the user profile 119. In one embodiment, when the hold status management platform 101 presents an alert notification, the hold status management platform 101 can stop the presentation of user media.

In one embodiment, if the change determined is other than the live operator resumes the communication session, for example, that the wait time for the live operator has been updated, the hold status management platform 101 can continue to monitor the hold media until the hold status management platform 101 determines that the live operator resumes the communication session.

Figure 4:
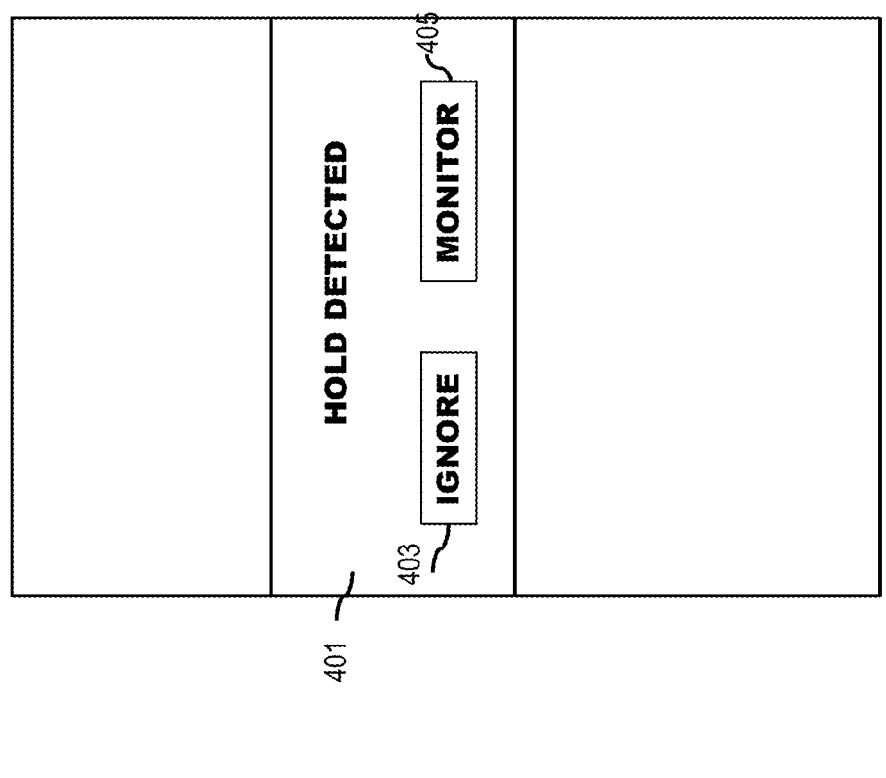
FIG. 4 is a diagram of a user interface utilized in the process of FIG. 3, according to one embodiment.
Figure 5:
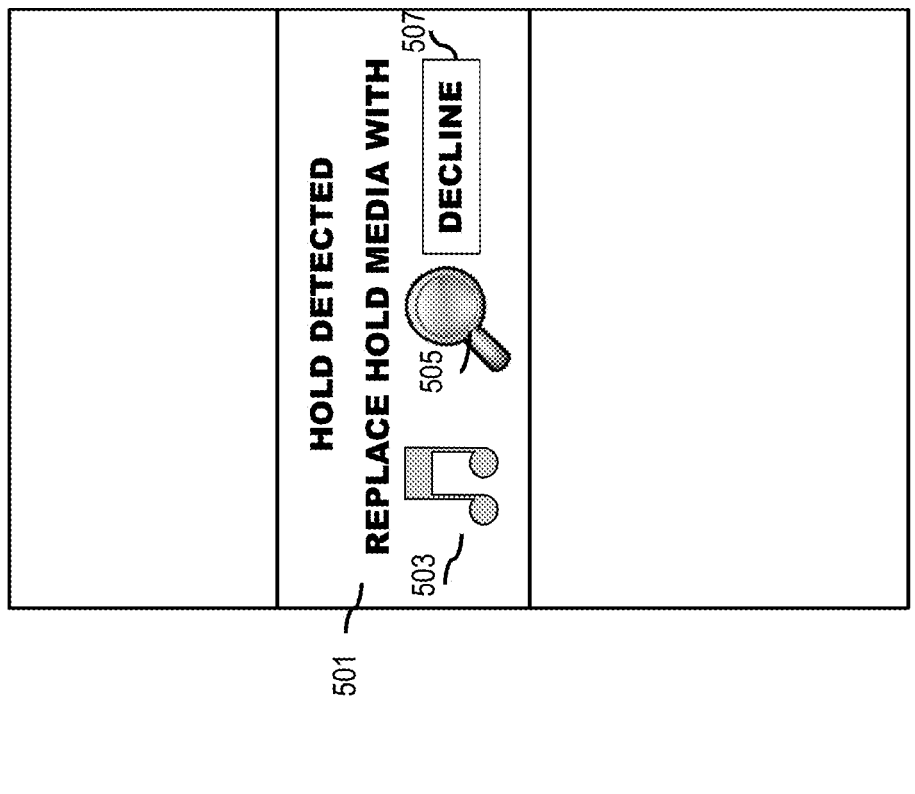
FIG. 5 is a diagram of a user interface utilized in the process of FIG. 3, according to one embodiment.
Figure 6:
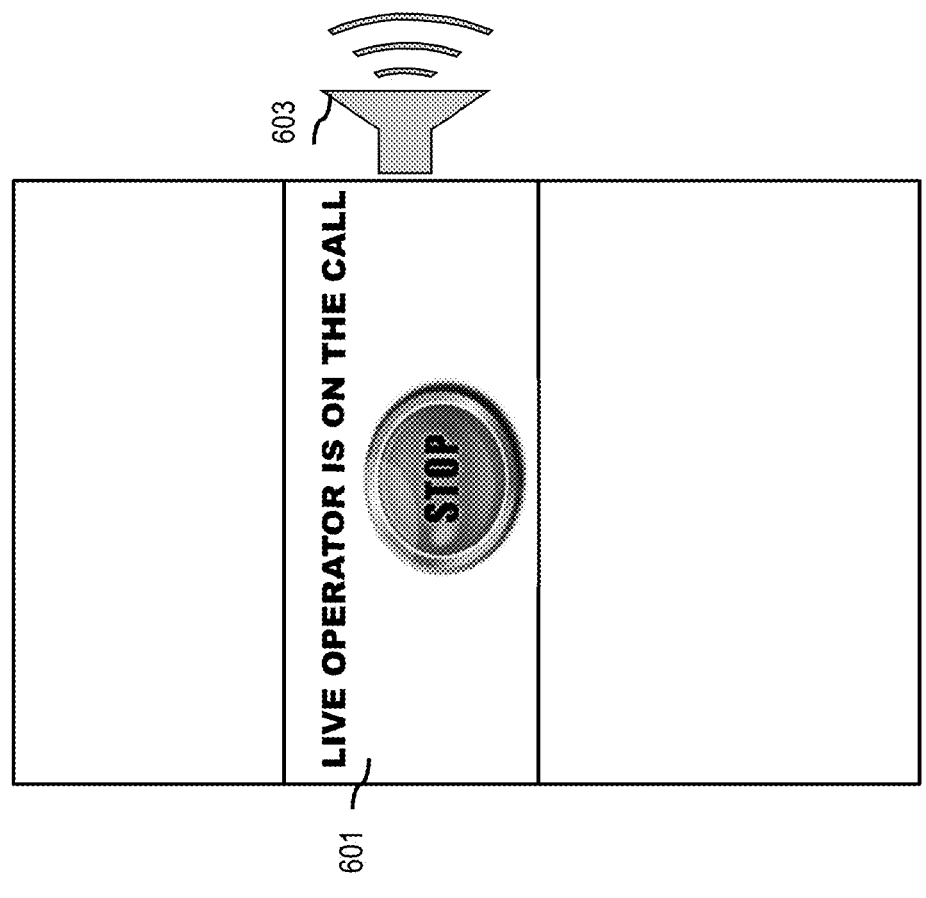
FIG. 6 is a diagram of a user interface utilized in the process of FIG. 3, according to one embodiment.

FIGS. 4-6 are diagrams of user interfaces utilized in the process of FIG. 3, according to one embodiment. FIG. 4 illustrates the user interface rendered when the hold status management platform 101 runs in the background and detects a hold status. When a hold status is detected, the application 109 may render the hold status interface 401. The user may select between ignoring (403) or monitoring the hold status of the communication (405).

By selecting monitoring, the hold status application 109 may monitor the hold media to determine a change in the communication session. In one embodiment, the application 109 may then present user media and/or user media options for the user. According to one embodiment, the user media the user may choose from may be preloaded in the application 109. The user may be able to select which list of user media may be available to her in the user profile 119. FIG. 5 shows the user interface when the user selects monitoring, for example, in the user interface of FIG. 4, or when the user indicates in the application 109 the presence of a hold status. When the hold status is detected, the application 109 may render the user media interface 501. The user may select between one or more applications (503, 505) or decline (507) to replace the user media. The user may configure the user media provided in the user media interface (501), such as select the applications to present.

FIG. 6 illustrates the user interface rendered by the application 109 when a change in the hold status is detected. When the resumption of the call by the live operator is detected, the application 109 may render the alert notification interface 601. The alert notification interface 601 may indicate that the operator is on the call and the user media presented, for example, based on the selection in the user interface of FIG. 5, may stop. The alert notification interface may also include an audio alert 603. The user may configure the alert notification provided in the alert notification interface (601), such as: select the device to receive the notification, the type of visual alert, the type of audio alert (603), a vibration alert, or a combination thereof.

Figure 7:
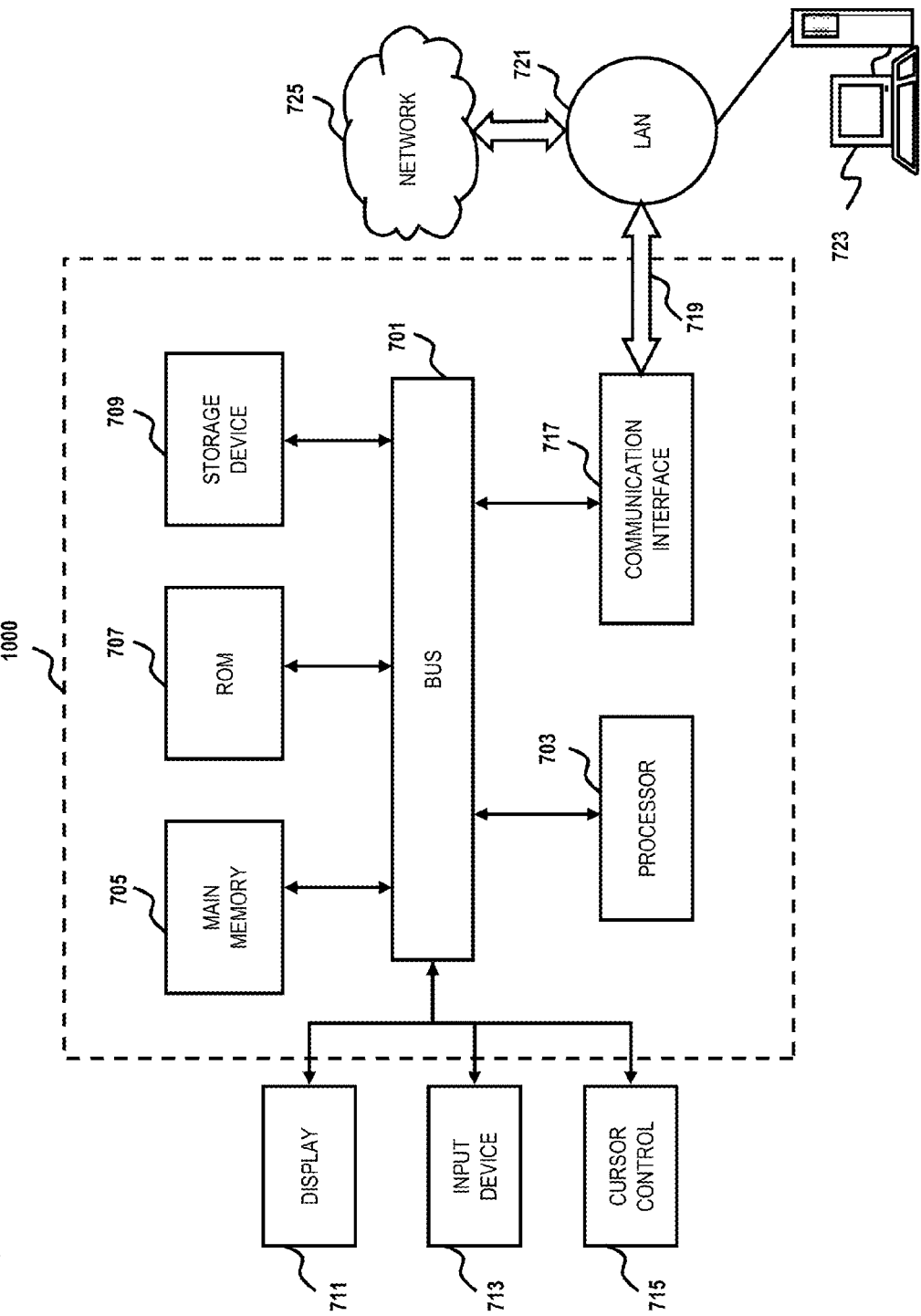
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set 800 upon which an embodiment of the invention may be implemented. Chip set 800 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIG. 3.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
   detecting a hold status of a communication session associated with a device;
   monitoring hold media transmitted to the device during the hold status;
   receiving, from a user of the device, a selection of user media;
   playing the user media at the device, while simultaneously receiving the hold media,
     wherein the user media is played in lieu of playing the hold media,
     wherein the user media and the hold media are different media;
   continuing to monitor the hold media as the hold media is received, while the user media is played;
   processing the monitored hold media, while the user media is played, to determine a variation in a characteristic of the hold media;
   determining a change in the hold status based on the variation in the characteristic of the hold media;
   presenting an alert notification on the device, another device, or a combination thereof to indicate the change in the hold status; and
   ceasing playing the user media based on determining the variation in the characteristic of the hold media.

2. The method of claim 1, wherein the alert notification is a visual alert, an audio alert, a vibration alert, or a combination thereof.

3. The method of claim 1, further comprising:
   processing the monitored hold media, the variation in the characteristic, or a combination to determine a resumption of the communication session by a live operator; and
   determining the change in the hold status based on the resumption.

4. The method of claim 1, further comprising:
   capturing a reference sample of the hold media while the user media is played; and
   comparing the monitored hold media to the reference sample to determine the variation in the characteristic.

5. The method of claim 4, wherein the characteristic includes a frequency, a tone, a pattern, a volume level, or a combination thereof.

6. The method of claim 1, further comprising:
   selecting the user media based on a user profile, a present configuration, a content of the hold media, or a combination thereof.

7. The method of claim 1, wherein the user media is stored locally at the device.

8. An apparatus comprising a processor configured to:
   detect a hold status of a communication session associated with a device;
   monitor hold media transmitted to the device during the hold status;
   receive a selection of user media;
   play the user media at the device, while simultaneously receiving the hold media,
     wherein the user media is played in lieu of playing the hold media;
   continue to monitor the hold media, while the user media is played;
   process the monitored hold media, while the user media is played, to determine a variation in a characteristic of the hold media;
   determine a change in the hold status based on the variation in the characteristic of the hold media; and
   present an alert notification on the device, another device, or a combination thereof to indicate the change in the hold status.

9. The apparatus of claim 8, wherein the alert notification is a visual alert, an audio alert, a vibration alert, or a combination thereof.

10. The apparatus of claim 8, wherein the processor is further configured to:
    process the monitored hold media, the variation in the characteristic, or a combination to determine a resumption of the communication session by a live operator; and
    determine the change in the hold status based on the resumption.

11. The apparatus of claim 8, wherein the processor is further configured to:
  capture a reference sample of the hold media while the user media is played; and
  compare the monitored hold media to the reference sample to determine the variation in the characteristic.

12. The apparatus of claim 11, wherein the characteristic includes a frequency, a tone, a pattern, a volume level, or a combination thereof.

13. The apparatus of claim 8, wherein the processor is further configured to:
  select the user media based on a user profile, a present configuration, a content of the hold media, or a combination thereof.

14. The apparatus of claim 13, wherein the selection is based on a comparison of the hold media to the user media.

15. A system comprising:
  a hold status management platform configured to:
    detect a hold status of a communication session associated with a device by identifying hold media transmitted to the device during the hold status;
    present user media, at the device, in lieu of presenting the hold media;
    continuing to receive the hold media while the user media is presented at the user device;
    monitor the hold media transmitted to the device during the hold status and while the user media is presented at the user device;
    process the monitored hold media to determine a variation in a characteristic of the hold media;
    determine a change in the hold status based on the variation;
    present an alert notification on the device, another device, or a combination thereof to indicate the change in the hold status; and
    cease presenting the user media, at the device, based on the determination of the change in the hold status based on the variation in the characteristic of the hold media.

16. The system of claim 15, wherein the alert notification is a visual alert, an audio alert, a vibration alert, or a combination thereof.

17. The system of claim 15, wherein the hold status management platform is further configured to:
  process the monitored hold media, the variation in the characteristic, or a combination to determine a resumption of the communication session by a live operator; and
  determine the change in the hold status based on the resumption.

18. The system of claim 15, wherein the hold status management platform is further configured to:
  capture a reference sample of the hold media; and
  compare the monitored hold media to the reference sample to determine the variation in the characteristic.

19. The system of claim 18, wherein the characteristic includes a frequency, a tone, a pattern, a volume level, or a combination thereof.

20. The system of claim 18, wherein the user media is stored locally at the device.

* * * * *